July 11, 1939.  W. T. YOUNG ET AL  2,165,993
TRANSMISSION GEARING AND BRAKE
Filed Nov. 10, 1936  3 Sheets-Sheet 1
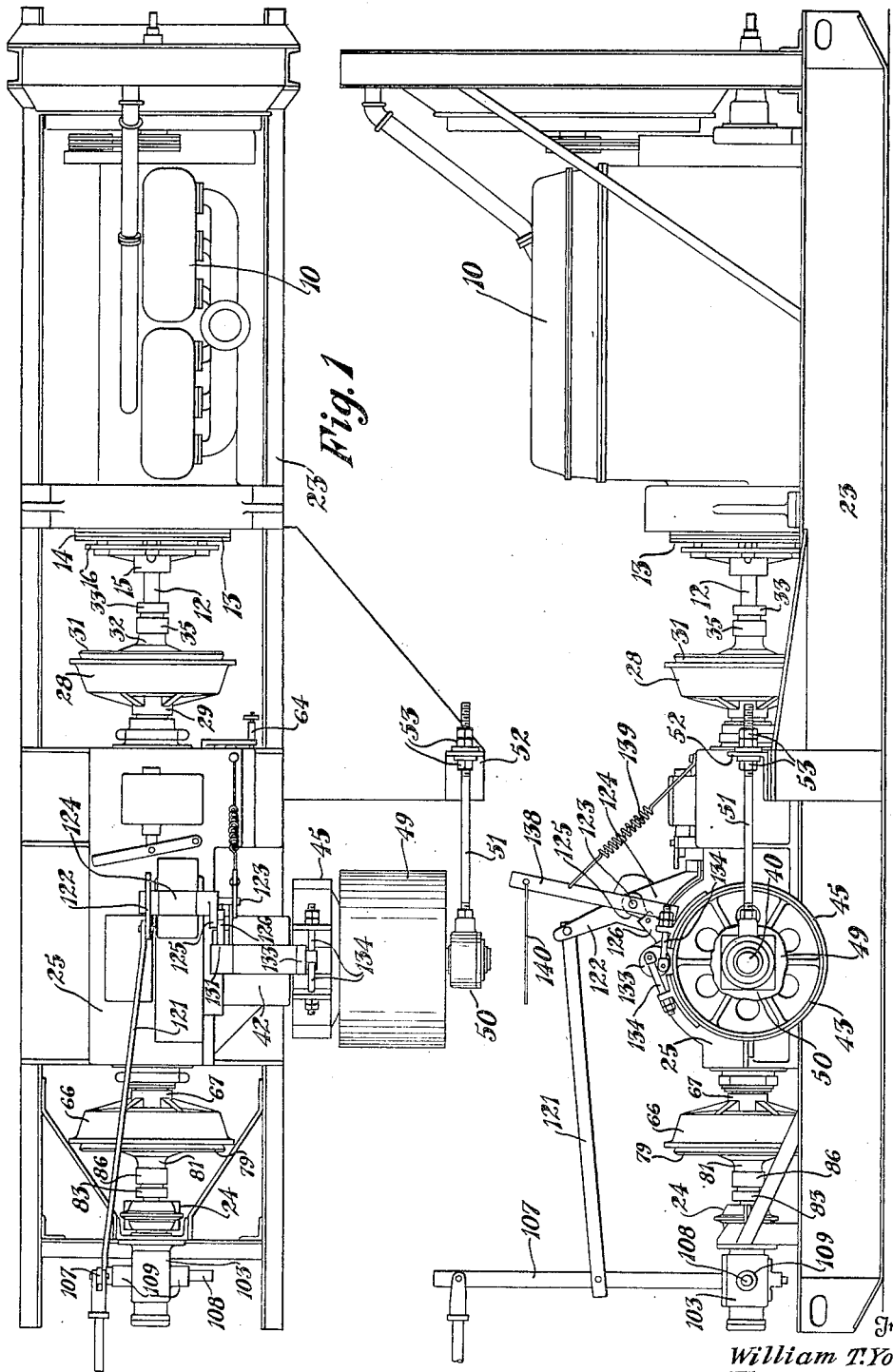
Inventors
William T. Young and
Thomas L. Fawick
By Frease and Bishop
Attorneys

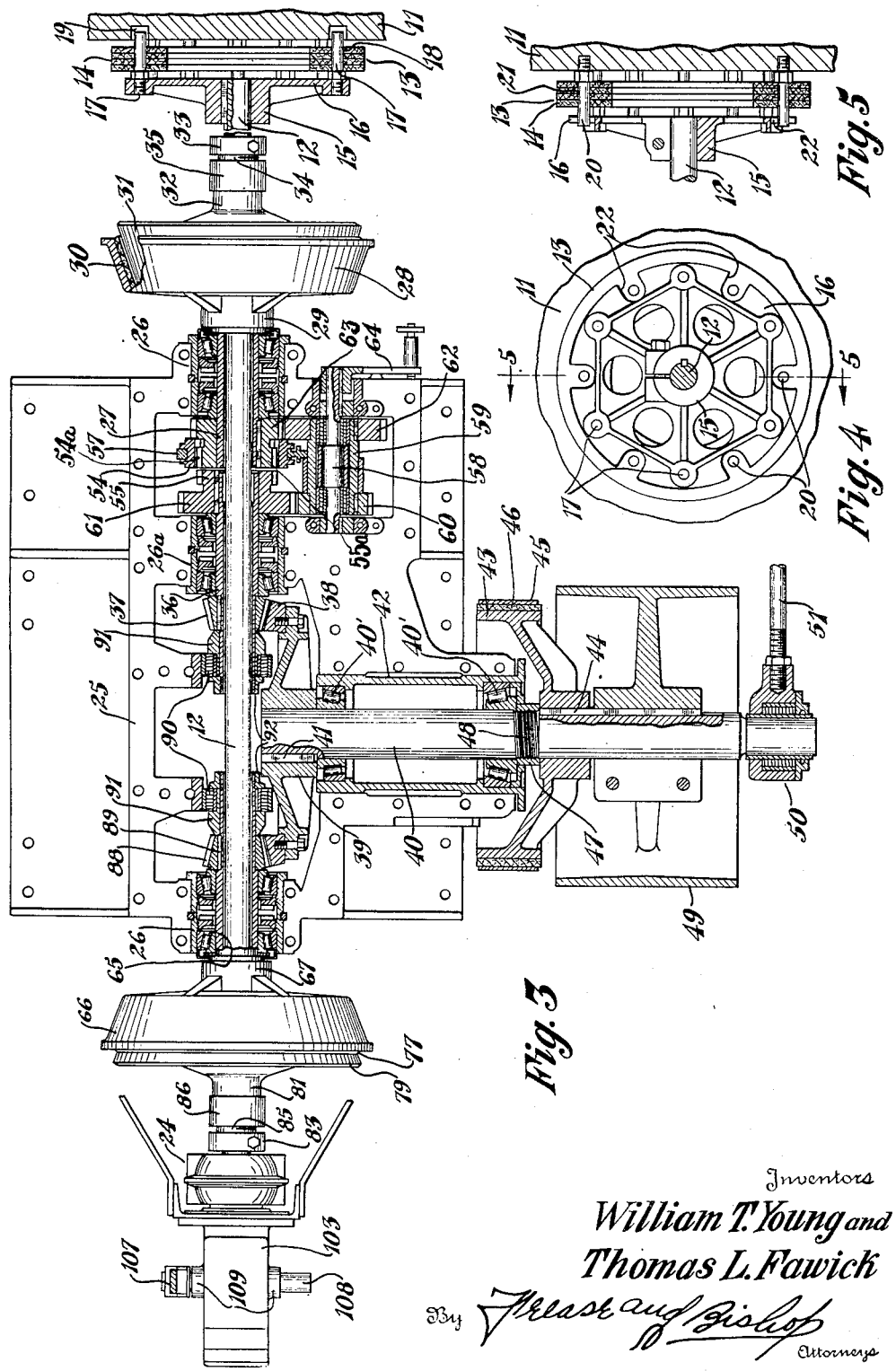

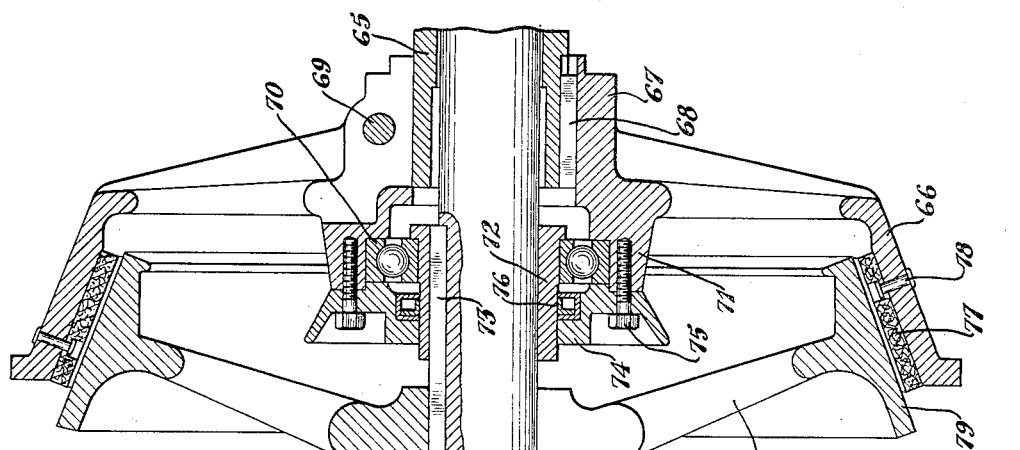

Patented July 11, 1939

2,165,993

UNITED STATES PATENT OFFICE 2,165,993

TRANSMISSION GEARING AND BRAKE

William T. Young, Canton, and Thomas L. Fawick, Akron, Ohio

Application November 10, 1936, Serial No. 110,104

6 Claims. (Cl. 192—4)

The invention relates to transmission gearing and clutches and more particularly to such mechanism especially adapted for use in connection with power plants for well drilling apparatus and the like.

An important object of the invention is to provide a double cone clutch with positive engaging, disengaging and centering means.

A further object is to provide such a structure in which the thrust load developed by engaging either clutch is taken by double tapered bearings which carry the driven members of the cone clutches.

Another object is to provide a clutch in which the friction material is on the inside of the driven member so that centrifugal force assists in holding the friction material on rather than throwing it off.

Still another object is to provide a rocker arm and link mechanism arranged to go over center in either direction to hold either clutch engaged.

A further object of the invention is to provide stop screws for contact with opposite ends of the rocker arm to prevent it going too far over center so as to form an equalizing arrangement.

A still further object is to provide an automatic brake which engages whenever both clutches are disengaged and releases before either clutch starts to engage.

Another object is to provide a flexible coupling for the flywheel, using power to drive with as well as to slide, and also compensating for misalinement of the engine and the main drive shaft.

Still another object is to provide means for adjusting the main ring gear to adjust the entire carrier assembly in and out.

An additional object is to provide adjustable nuts in the center of the carrier for moving the pinions endwise and obtaining the proper working pitch.

The foregoing and other objects, together with their attendant advantages, will be apparent as the invention becomes better understood from the following specification and accompanying drawings forming a part hereof, it being obvious that various changes may be made in the details of construction without departing from the spirit of the invention as set forth in the claims.

An embodiment of the invention thus set forth in general terms is illustrated in the accompanying drawings, in which .

Figure 1 is a top plan view of a power plant for use in connection with well drilling apparatus and the like showing the invention applied thereto;

Fig. 2 is a side elevation of the construction illustrated in Fig. 1;

Fig. 3 is a plan sectional view on an enlarged scale of the transmission gearing, clutches and brake, showing the flexible coupling for connecting the main drive shaft of the transmission gearing to the flywheel of the engine;

Fig. 4, an elevation of the flexible coupling;

Fig. 5, a section through the flexible coupling, taken as on the line 5—5, Fig. 4;

Fig. 6, an enlarged sectional view through one of the clutches and the rocker arm and link mechanism for holding the clutches in either position; and Fig. 7, an enlarged fragmentary detail view of the brake tripping mechanism.

Similar numerals refer to similar parts throughout the drawings.

The invention is illustrated as applied to a power plant intended for use in connection with well drilling apparatus and the like. The source of power is illustrated as a high speed internal combustion engine indicated generally at 10, provided with a flywheel 11 which drives the main drive shaft 12 as through a flexible coupling indicated generally at 13.

This flexible connection includes a laminated ring 14 of fiber or the like interposed between the flywheel and the main drive shaft, a collar 15 being fixed upon the adjacent end of the shaft and provided with the peripheral flange 16 in which are fixed the ends of several pins 17 slidably located through suitable apertures 18 in the laminated fiber ring and adapted to be received in the enlarged sockets 19 in the flywheel.

A plurality of similar pins 20 is fixed at one end in the flywheel and slidably located through suitable openings 21 in the laminated fiber ring, the free ends being adapted to be received in the enlarged notches or apertures 22 in the flange 16.

This provides a flexible coupling between the engine and the drive shaft 12 which permits starting of the engine without undue stress or strain thereon and provides a suitable drive connection which permits relative sliding movement of the shaft and flywheel without disturbing the driving connection.

The entire power plant may be mounted on a frame 23 which may be supported in any desired manner for transportation or the like, an end bearing for the shaft 12, indicated generally at 24, being mounted upon said frame in a manner to be later described.

At any desired point intermediate the flywheel and the end bearing, there may be mounted on the frame 23 a housing 25 which is preferably constructed in sections, as is customary with devices of this nature.

In each end of this housing there is provided a bearing indicated generally at 26 through which extends the main drive shaft 12. Each of the bearings 26 is preferably in the form of a double taper roller bearing as illustrated in Fig. 3, so as to compensate for end thrust in either direction as well as to provide an antifriction bearing for the shaft.

Loosely surrounding the shaft 12 and journaled in one of the bearings 26 is a sleeve 27 adapted to be connected to the shaft as by a cone friction clutch including the conical cup 28 having a hub 29 fixed upon the sleeve 27 in any usual and well known manner and having the friction material 30 fixed upon the inner surface thereof and adapted to be engaged by the metal cone 31, the hub 32 of which may be keyed or otherwise fixed upon the shaft 12 and adapted to be adjusted longitudinally thereon as by the collar 33 pinned or otherwise fixed upon the shaft 12 and having the threaded nipple 34 engaged by the internally threaded adjusting nut 35 which contacts the end of the hub 32.

Also loosely surrounding the shaft and journaled in a second bearing 26a which may be similar to the bearings 26, within the housing 25, is a second sleeve 36 carrying at its inner end a bevel pinion 37 continuously meshing with a bevel gear 38, the hub 39 of which is secured to a transversely extending shaft 40 as by the key 41.

This shaft may be journaled through the taper roller bearings 40' located in opposite ends of the shaft housing 42 which is mounted within the housing 25. A brake drum 43 may be fixed upon the shaft 40 as by means of the key 44 and is surrounded by the brake band 45 having a friction lining 46.

An adjusting nut 47 is mounted upon the threaded intermediate portion 48 of the shaft 40 for the purpose of adjusting the shaft assembly longitudinally relative to the antifriction bearings 41. This adjustment is produced by the nut 47 contacting the end of the cone of the adjacent roller bearing 40' to slidably move said cone upon the shaft 40. Although it has been found by experience that the nut 47 will not turn upon the shaft after being adjusted, a set screw or any other usual and well known equivalent may be provided if desired.

A pulley, sprocket or the like as indicated at 49 is fixed upon the shaft 40 as by the key 44 to transmit power from the power plant to a well drilling apparatus or the like. The outer end of the shaft 40 may be journaled in an outboard bearing indicated generally at 50 and supported as by the tie-rod 51 adjustably connected to a bracket portion 52 upon the housing 25 as by the nuts 53.

When it is desired to rotate the shaft 40 at high speed in a forward direction, the sleeves 27 and 36 are operatively connected by shifting the clutch ring 54 longitudinally on the splined hub 55a and into engagement with the gear 55 to cause its internal splines 54a to engage the teeth on the gear 55 coupling the gear 55 to the splined hub 55a through the internally splined clutch ring 54. This shifting movement may be accomplished by a handle 57 and directly couples the sleeves 27 and 36, causing the bevel pinion 37 to rotate at the same speed as the shaft 12.

At times it may be desirable to rotate the shaft 40 at a lower speed. For permitting this operation there is eccentrically journaled within the housing 25 a countershaft 58 extending parallel to the shaft 12. Loosely surrounding the countershaft is a sleeve 59 having secured to one end thereof a spur gear 60 adapted to mesh with a larger spur gear 61 on the sleeve 36. On the other end of the sleeve 59 is fixed a spur gear 62 adapted to mesh with a smaller spur gear 63 fixed upon the sleeve 27.

It will be apparent that the gear ratio of the various spur gears is such that when the operating handle 64 is moved the shaft 58 is eccentrically moved to bring the gears into the position shown in Fig. 3, and the bevel pinion 37 will be driven at a lower speed than the speed of the drive shaft 12.

For the purpose of rotating the driven bevel gear 38 in a reverse direction there is loosely journaled upon the shaft 12, within the other bearing 26, a sleeve 65, corresponding to the sleeve 36, and adapted to be connected to the shaft 12 for rotation therewith by means of a clutch of the same construction as that provided for the sleeve 36 and above described. This clutch includes the conical cup member 66, the hub 67 of which may be fixed upon the sleeve 65 as by the key 68 and the clamping screw 69. This cup member, as well as the cup member 28 of the other clutch, is preferably provided with a ball bearing indicated generally at 70, interposed between the annular flange 71 of the hub thereof and the collar 72 which may be fixed upon the shaft 12 as by the key 73, a ring 74 surrounding said collar and being attached to the flange 71 as by screws 75 and provided with a lubricant retainer as indicated generally at 76.

A friction lining 77 of fiber or the like is fixed to the inner surface of the cone 66 as by the rivets 78 in the same manner as the friction lining for the other clutch above described, so that centrifugal force will tend to hold the lining upon the clutch.

The cone member 79 of this clutch is connected by spokes 80 with the hub 81 which is fixed upon the shaft 12 as by the key 73 and clamping screw 82.

For the purpose of longitudinally adjusting the cone member upon the shaft 12, a collar 83 may be fixed upon the shaft as by the pin 84 and provided with the reduced threaded extension 85 arranged to be engaged by the adjusting nut 86 adapted to abut the hub portion 81 of the cone member and provided with a set screw 87 for holding the same in adjusted position.

A bevel pinion 88 is fixed upon the sleeve 65 as by the key 89 and meshes with the bevel gear 38 at a point diametrically opposite to the bevel pinion 37.

Both of the sleeves 36 and 65 may be extended inwardly beyond the bevel pinions 37 and 88 respectively and journaled within antifriction bearings 90 mounted within the housing 25. Adjusting collars 91 may be mounted upon these sleeves and interposed between the antifriction bearings and the bevel pinions and adjusted as by the adjusting nuts 92 mounted upon the threaded inner ends of the sleeves.

The bearing 24 which supports the end of the shaft 12 is in the form of a self-centering antifriction bearing comprising the rounded housing 93 in which is mounted a pair of similarly rounded bearing carrier rings 94 containing two ball bearings 95 which surround the reduced end portion 96 of the shaft 12, a nut 97 being mounted upon the threaded extremity 98 thereof for clamping the inner races 99 of the ball bearings against the shoulder 100 of the shaft.

The open end of the housing 93 is preferably provided with a grease retainer 101 surrounding the shaft 12 while the other end thereof is formed into a reduced portion 102 slidably located within the box 103 and preferably provided with a packing ring 104.

A slotted extension 105 is formed upon the reduced portion 102 of the bearing housing and extended through the box 103, being provided at its end with the flange 106 slidably mounted in the outer end of the box.

The control lever 107, by means of which the above described clutches and brake are operated, is fixed upon a rocker shaft 108 journaled through suitable bearings 109 upon the box and located through the slot 110 in the extension 105.

A double rocker arm 111 is fixed upon the rocker shaft 108 within the box 103 and has pivotally connected to opposite ends as by the pins 112 and 113, the links 114 and 115 respectively, provided with yokes 116 at their ends for engagement with the studs 117 and 118 respectively, fixed to opposite ends of the extension 105.

Adjusting screws 119 are located through threaded openings in the box 103 and held in adjusted position as by the jam nuts 120 for limiting the movement of the double rocker arm 111 in each direction, being so adjusted that they stop movement of the rocker arm in either direction just after the studs 112 or 113 pass below the center line extending through the centers of the shaft 108 and studs 117 and 118. This tends to hold the parts in either position. With the lever 107 in vertical position and the other parts in the position as shown in Fig. 6, both of the clutches are in neutral position while the brake is automatically applied.

To accomplish this, a link 121 may connect the operating lever 107 with the brake lever 122 which is fixed upon the rocker shaft 123 journaled in the bearing 124 mounted upon the housing 25. A rocker arm 125 is fixed upon the rocker shaft 123 and the block 126 is pivotally connected thereto at one end as at 127, the other end of the zlock being pivotally connected to the link 128 as at 129. The opposite end of this link is pivoted as at 130 to the rocker arm 131 upon the rocker shaft 132 upon which is fixed a disk 133 to which the brake rods 134, connected to opposite ends of the brake band 45, are pivoted at diametrically opposite points.

The inner or upper end of the link 128 is adapted to normally bear against a stop pin 135 upon the block 126. A link 136 is pivoted to the block 126 as at 129, the other end of said link being pivoted as at 137 to the lower end of the brake trip lever 138 which is journaled upon the shaft 123 and provided with a spring 139 for normally holding the same in the position shown in Figs. 2 and 7, a trip rod or wire 140 being connected to the upper end of said trip lever for operating the same.

As the operating lever 107 is moved to the neutral position as shown in Figs. 2 and 6, the shaft 12 is moved longitudinally to such position as to hold both of the clutches in neutral position, each of the cone members 31 and 79 being out of contact with the friction linings of their respective cup members.

At the same time the brake lever 122 is moved to the position shown in Fig. 2, moving the associated parts to the position best shown in Fig. 7, rotating the shaft 132 and with it the disk 133 in a direction to draw the ends of the brake band toward each other and tighten the same around the brake drum.

It will be seen that movement of the brake lever 122 in either direction from this position will cause the rocker arm 131 to be moved in the direction of the arrow shown in Fig. 7, releasing the brake. Assuming the parts to be in the position shown in Fig. 7, with both clutches in neutral position and the brake applied, it will be seen that the centers 123, 127, 129 and 130 are located in a straight line passing through all of said centers. Movement of the brake lever 122 to the left will rotate the rocker shaft 123 counterclockwise, swinging the rocker arm 125 in the same direction and through the pivot 127, the block 126 will be pulled therewith.

Through the pivot 129 the link 128 will be pulled to the right and upward and through the pivot 130 the link 128 will swing the rocker arm 131 in the direction of the arrow shown in Fig. 7.

Again assuming the parts to be in the position shown in Fig. 7, movement of the brake lever 122 to the right will rotate the rocker shaft 123 clockwise, swinging the rocker arm 125 clockwise and through the pivot 127 pulling the block 126 upward. Through the pivot 129 and the block 126 will pull the link 128 upward and this link, through the pivot 130, will swing the rocker arm 131 in the direction of the arrow shown in Fig. 7.

If it is desired to release the brake while the clutches are both in neutral position, the trip rod or wire 140 is pulled toward the left, as viewed in Fig. 2, swinging the brake trip lever 138 therewith and through the link 136 the block 126 and link 128 will be caused to jackknife upon the pivot 129, pulling the rocker arm 131 in the direction of the arrow shown in Fig. 7 and releasing the brake. It will be seen that when the pull upon the trip rod 140 is released, the spring 139 will return the trip lever and associated parts to normal position.

We claim:

1. A power plant comprising a source of power, a main drive shaft driven thereby, means for longitudinally moving said drive shaft, a spaced pair of clutch cones fixed upon said drive shaft, a pair of clutch cups loosely carried by said shaft, a bevel pinion fixed to each clutch cup, a driven shaft extending at an angle to said drive shaft, a bevel gear on said driven shaft meshing with said bevel pinions, a brake upon said driven shaft, means for longitudinally moving said drive shaft to engage either clutch cone with the corresponding clutch cup and for rendering both clutches neutral, and means operated by the rendering of both clutches neutral for applying said brake.

2. A power plant comprising a source of power, a main drive shaft driven thereby, a pair of spaced bevel pinions loosely carried by said shaft, a driven shaft extending at an angle to said drive shaft, a bevel gear on said driven shaft meshing with said bevel pinions, a brake upon said driven shaft, means for rendering either of said bevel pinions operative for rotating the driven shaft in the desired direction and for rendering both pinions inoperative, means operated by the rendering of both bevel pinions inoperative for applying said brake, and trip means for releasing the brake while both bevel pinions are inoperative.

3. A power plant comprising a source of power, a main drive shaft driven thereby, means for longitudinally moving said drive shaft, a spaced pair of clutch cones fixed upon said drive shaft, a pair of clutch cups loosely carried by said shaft, a bevel pinion fixed to each clutch cup, a driven shaft extending at an angle to said drive shaft, a bevel gear on said driven shaft meshing with said bevel pinions, a brake upon said driven shaft, means for longitudinally moving said drive shaft to engage either clutch cone with the corresponding clutch cup and for rendering both clutches neutral, means operated by the rendering of both clutches neutral for applying said brake, and trip means for releasing the brake while both clutches are in neutral position.

4. A power plant comprising a source of power, a main drive shaft driven thereby, a pair of spaced bevel pinions loosely carried by said shaft, a driven shaft extending at an angle to said drive shaft, a bevel gear on said driven shaft meshing with said bevel pinions, a brake upon said driven shaft, means for rendering either of said bevel pinions operative for rotating the driven shaft in the desired direction and for rendering both pinions inoperative, means operated by the rendering of both bevel pinions inoperative for applying said brake, and positive means for maintaining both pinions inoperative.

5. A power plant comprising a source of power, a main drive shaft driven thereby, means for longitudinally moving said drive shaft, a spaced pair of clutch cones fixed upon said drive shaft, a pair of clutch cups loosely carried by said shaft, a bevel pinion fixed to each clutch cup, a driven shaft extending at an angle to said drive shaft, a bevel gear on said driven shaft meshing with said bevel pinions, a brake upon said driven shaft, means for longitudinally moving said drive shaft to engage either clutch cone with the corresponding clutch cup and for rendering both clutches neutral, means operated by the rendering of both clutches neutral for applying said brake, and positive means for holding the drive shaft in position to render both clutches neutral.

6. A power plant comprising a source of power, a main drive shaft driven thereby, means for longitudinally moving said drive shaft, a spaced pair of clutch cones fixed upon said drive shaft, a pair of clutch cups loosely carried by said shaft, a bevel pinion fixed to each clutch cup, a driven shaft extending at an angle to said drive shaft, a bevel gear on said driven shaft meshing with said bevel pinions, a brake upon said driven shaft, a double rocker arm and links pivotally connected to the ends of the rocker arm and operatively associated with the drive shaft for longitudinally moving said drive shaft to engage either clutch cone with the corresponding clutch cup and for rendering both clutches neutral and for positively holding the drive shaft in either position, and means operated by the rendering of both clutches neutral for applying said brake.

WILLIAM T. YOUNG.
THOMAS L. FAWICK.